(No Model.)
W. I. LINDSAY.
CAR WHEEL.
No. 294,890. Patented Mar. 11, 1884.
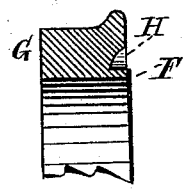
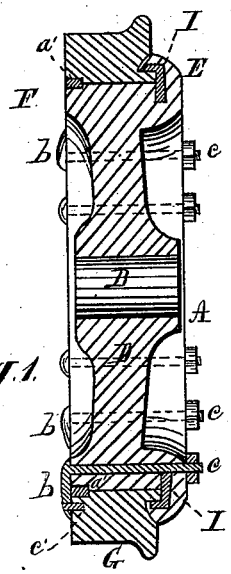
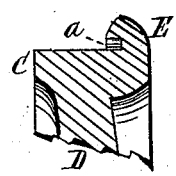
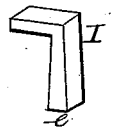
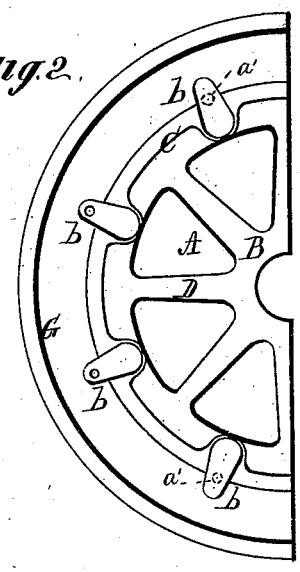
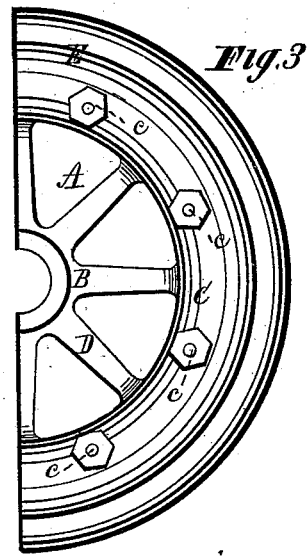
Witnesses
Inventor

UNITED STATES PATENT OFFICE.

WILLIAM I. LINDSAY, OF CLEVELAND, OHIO.

CAR-WHEEL.

SPECIFICATION forming part of Letters Patent No. 294,890, dated March 11, 1884.

Application filed December 1, 1882. (No model.)

*To all whom it may concern:*

Be it known that I, WILLIAM I. LINDSAY, of Cleveland, in the county of Cuyahoga and State of Ohio, have invented a certain new and Improved Railway-Car Wheel; and I do hereby declare that the following is a full, clear, and complete description thereof.

The car-wheel above alluded to consists of two sections—a tire and center. The two sections are related to each other by an annular tongue and groove, and secured in such tongue-and-groove relation by bolts inserted transversely through the rim of said center, below the inner surface of the tire, substantially as herein described, and illustrated in the accompanying drawings, making a part of this specification, in which—

Figure 1 represents a transverse section of the wheel; Fig. 2, a view of the outer side of the wheel; Fig. 3, a view of the inner side; Fig. 4, a detached section enlarged. Figs. 5, 6, and 7 are detached sections.

Like letters of reference refer to like parts in the several views.

As shown in the drawings, A represents the central section of the wheel, consisting of the hub B, rim C, and spokes D. The rim C has an annular projecting flange, E, Fig. 6, having on the side thereof an annular groove, *a*, in which is fitted a corresponding annular tongue or rib, F, Fig. 5, formed on the edge of the tire G. In the side of the tire, immediately around the said tongue, is a groove, H, in which the outer side or shoulder of the annular groove *a* above alluded to is fitted, thereby interlocking the two sections of the wheel firmly together, as shown in Fig. 1. The two sections of the wheel thus interlocked together are prevented from becoming laterally disconnected by the bolts *c*, inserted transversely through the rim of section A of the wheel. The elongated heads *b* of the bolts are so adjusted as to lap over onto the side of the tire, as shown in Fig. 2, whereas the nuts of the bolts are screwed down upon the side of the rim C, thereby drawing and clamping the two sections of the wheel firmly and securely together, making a safe, strong, and durable wheel. In the event the tire should break, it cannot become detached from the central section, A, as the broken tire will still be held thereto by the interlocking tongue and groove. It therefore cannot fly off tangentially, nor can it separate laterally, for reason of the binding-bolts.

Fig. 4 represents an angle-iron for re enforcing the flange E. To this end the angle-iron is bedded in the matrix of section A of the wheel, as shown in Fig. 1, in which it will be seen that the end *e* of the angle-iron is buried in the rim C, and so adjusted that the angle of the iron will conform to the angle of the groove *a* in the flange E, and form a part of the bottom and one side of the groove. It will be observed that the said end *e* is thicker than the part near the angle; hence it cannot be pushed radially outward. Therefore the radial strain which may be exerted upon the flange E will be borne in part by the angle-iron, thereby re-enforcing the flange. More or less number of angle-irons may be used and arranged at any desirable points around in the flange.

That the connection of the tire to the body of the wheel may be all the more secure is the purpose of the pin *c'*. Said pin is inserted through the head of the bolt and into the tire of the wheel, as seen in Fig. 1. The pin and bolt serve as a clamp for binding the two parts together. For further securing the tire to the body of the wheel, dowel-pins are inserted in the junction of the tire with said body, as shown at *a'*, which will effectually prevent the tire from turning around upon the central part of the wheel; hence, should the tire break, it cannot become detached therefrom.

What I claim as my invention, and desire to secure by Letters Patent, is—

1. The body and tire of the wheel, provided with the interlocking tongue and grooves, in combination with the bolt passing through the body, and provided with the pin for engaging the tire, and with the nut for securing the parts together, substantially as and for the purpose set forth.

2. The body of the wheel, provided with the angle-iron, and with the annular tongue and groove for engaging the corresponding tongue and groove formed in the tire, in combination with the bolt and pin for engaging the body and tire, substantially as and for the purpose set forth.

3. The body and tire of the wheel, provided with the interlocked tongue and groove, in combination with the dowel-pin for engaging the adjacent faces of the body and tire, and the bolt and pin for securing the parts together, substantially as and for the purpose set forth.

4. In combination with the sections A B of the herein-described car-wheel, the dowel-pins $a'$ and bolts $c$ and re-enforcing angle-irons, substantially as and for the purpose set forth.

In testimony whereof I affix my signature in presence of two witnesses.

WILLIAM I. LINDSAY.

Witnesses:
W. H. BURRIDGE,
J. H. BURRIDGE.